No. 662,363. Patented Nov. 20, 1900.
C. P. MAGAGNOS & W. H. FULTON.
PHOTOGRAPHIC FINDER.
(Application filed Apr. 21, 1900.)
(No Model.)
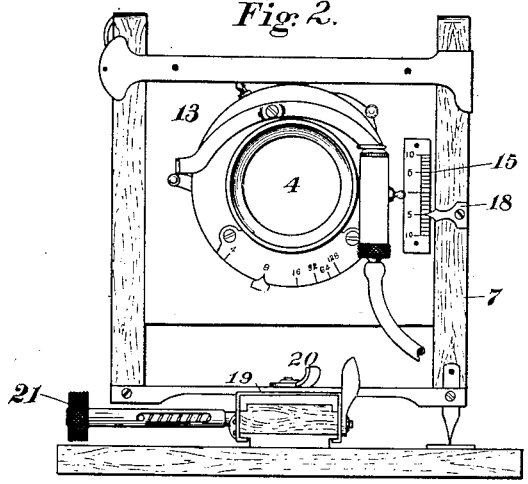
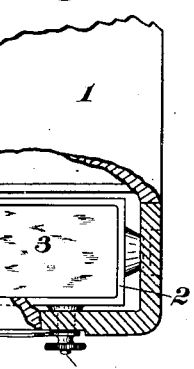
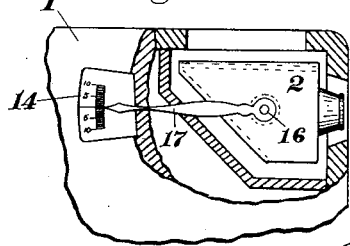
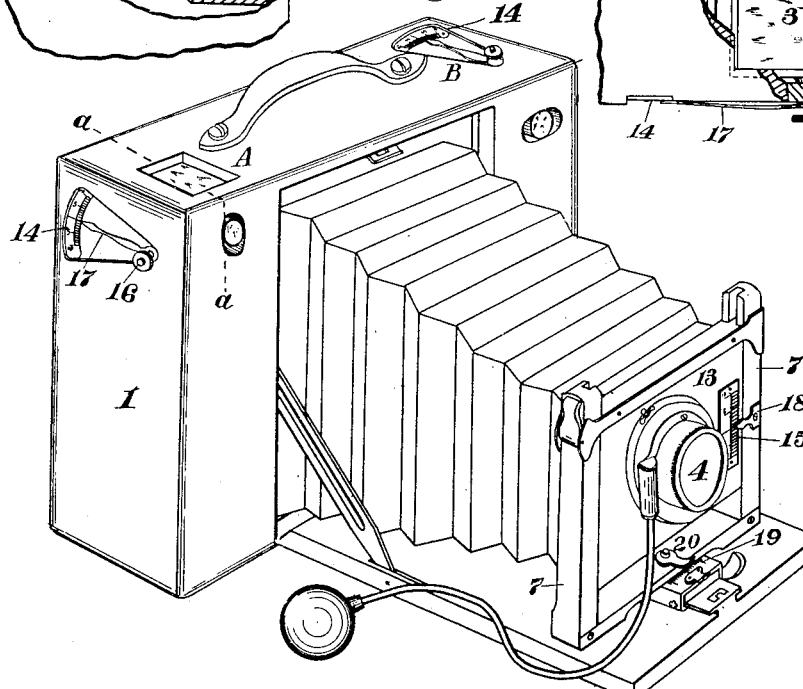
WITNESSES:
P. W. J. Lander,
Elmer Wickes.
INVENTORS:
William H. Fulton,
Charles P. Magagnos,
BY
J. Richards & Co.
ATTORNEYS.

UNITED STATES PATENT OFFICE.

CHARLES P. MAGAGNOS AND WILLIAM H. FULTON, OF ALAMEDA, CALIFORNIA.

PHOTOGRAPHIC FINDER.

SPECIFICATION forming part of Letters Patent No. 662,363, dated November 20, 1900.

Application filed April 21, 1900. Serial No. 13,731. (No model.)

*To all whom it may concern:*

Be it known that we, CHARLES P. MAGAGNOS and WILLIAM H. FULTON, citizens of the United States, residing at Alameda, county of Alameda, and State of California, have invented certain new and useful Improvements in Photographic Cameras; and we hereby declare the following to be a full, clear, and exact description of the same, reference being had to the accompanying drawings, forming a part of this specification.

Our invention relates to what are technically called "finders" for photographic cameras that are intended to produce a reduced picture of the subject or object in a plane coincident with that projected by the main lens on the plate and visible to an operator from the top, who from this small projected image can adjust the camera, and relates especially to an improved method of mounting and adjusting such finders.

The object of the invention is to attain a coincident line of vision in the finder and the main lens by separate adjustment of the two, so that the finder will truly indicate the position of the image on the plate or field.

Our improvement consists in pivotally mounting the finder of a photographic camera within the camera, so that it can be adjusted to different lines of vision or focus to correspond with those of the main lens, a pointer being affixed to the pivot of the finder and moving over a graduated scale outside the camera, in conjunction with a correspondingly-graduated scale and a pointer on the movable front board which carries the main lens and on the front frame, respectively, one moving with the lens and the other being fixed relatively thereto, whereby any movement of the main lens, as indicated on the scale connected therewith, will be indicated on the corresponding scale of the finder when the lines of vision are coincident.

In the accompanying drawings, forming a part of this specification, Figure 1 is a perspective view of a photographic camera provided with our improvement, the finders being adjusted by indicating-scales; Fig. 2, a front view of the lens and its supporting-frame as arranged in Fig. 1; Fig. 3, an enlarged section on the line $a\ a$ in Fig. 1, and Fig. 4 a top view of Fig. 3.

Referring to the drawings, the main case 1, as well as the various operating parts, is of the common construction, well understood, and do not require description except as modified by our improvement. The finder or indicator 2 is also of the usual construction, consisting of an obliquely-set mirror or prism of total reflection that reflects the image of the object at an angle of ninety degrees on the small field 3 coincident with the image of the same object projected on the plate by the lens at 4.

16 is the pivot of the finder projecting through the main case 1, to which is affixed outside the casing a pointer or index 17, moving over a graduated scale 14, the graduations indicating the direction of the rays from the object which strike the small field 3 of the finder.

7 is the fixed front frame of the camera, in which slides the front board 13, carrying the main lens 4.

15 is a graduated scale, and 18 is a pointer or index pointing to the graduations of said scale, the pointer being fixed relatively to the scale, or vice versa, one being attached to the movable front board 13 and the other to the fixed frame 7. The said scale is so placed relatively to its pointer that when the rays which enter the main lens and the finder are coincident the pointers on the respective scales point to the same graduations, as shown in Figs. 1 and 3.

In case the camera is to be used on its side two finders and two scales 14 are required, one for each position, as indicated at A B, Fig. 1.

For adjustment of the lens in the other plane or when the camera is used on its side we provide a second scale 19 and pointer 20, so that when the front board and lens are moved by the screw 21 the reading on this scale will be the same as on the one 15 and those in the main case, (marked 14,) so that the position of the main lens can be adjusted to the position indicated by the finder 2. In this manner while the scales 14 and 15 indicate the relative positions of the image on the field of the finder 2 and the main field the latter can be adjusted independently in a degree indicated by the two scales.

Having thus explained the nature and object of our invention, what we claim as new, and desire to secure by Letters Patent, is—

1. In a photographic camera, provided with a sightway, a finder pivotally mounted within the camera, beneath the sightway, an external pointer connected with the finder, and a scale to indicate the position of the latter in respect to the camera, substantially as specified.

2. In a photographic camera, provided with a sightway, a finder pivotally mounted within the camera, beneath the sightway, a main lens, an external pointer and scale to indicate the position of the finder in respect to the camera, and a second pointer and scale connected with and indicating the position of the main lens in respect to that of the finder, substantially as and for the purpose specified.

3. In a photographic camera, a main lens, a pivoted finder, and scales 14 and 15, with pointers, scale 14 indicating the position of the finder in respect to the camera, and scale 15 indicating the relative position of the main lens to that of the finder, all substantially as specified.

In testimony whereof we have signed our names to this specification in the presence of two subscribing witnesses.

CHARLES P. MAGAGNOS.
WILLIAM H. FULTON.

Witnesses:
ALFRED A. ENQUIST,
ELMER WICKES.